United States Patent
Yamamoto

(10) Patent No.: US 8,848,211 B2
(45) Date of Patent: Sep. 30, 2014

(54) MAINTENANCE PROGRAM CREATION FOR AN IMAGE FORMING APPARATUS

(71) Applicant: KYOCERA Document Solutions Inc., Osaka (JP)

(72) Inventor: Masakazu Yamamoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/907,380

(22) Filed: May 31, 2013

(65) Prior Publication Data

US 2013/0321842 A1    Dec. 5, 2013

(30) Foreign Application Priority Data

May 31, 2012 (JP) .................................. 2012-125373

(51) Int. Cl.
*H04N 1/00* (2006.01)
*G06F 11/00* (2006.01)
*G06F 11/07* (2006.01)
*G06F 9/44* (2006.01)

(52) U.S. Cl.
CPC .... *H04N 1/00087* (2013.01); *H04N 2201/0094* (2013.01); *G06F 11/006* (2013.01); *H04N 1/00973* (2013.01); *G06F 11/079* (2013.01); *H04N 1/00344* (2013.01); *G06F 8/00* (2013.01); *G06F 11/0733* (2013.01)
USPC ....................................... 358/1.13; 358/1.14

(58) Field of Classification Search
USPC ................................................ 358/1.13, 1.14
See application file for complete search history.

(56) References Cited

U.S. PATENT DOCUMENTS

| | | | |
|---|---|---|---|
| 2006/0176514 A1* | 8/2006 | Nakazato | 358/1.15 |
| 2009/0066994 A1* | 3/2009 | Pothos et al. | 358/1.15 |
| 2011/0299109 A1* | 12/2011 | Kamisuwa et al. | 358/1.14 |
| 2013/0194630 A1* | 8/2013 | Kishimoto | 358/1.15 |

FOREIGN PATENT DOCUMENTS

JP    2011-145947    7/2011

* cited by examiner

*Primary Examiner* — Qian Yang
(74) *Attorney, Agent, or Firm* — McDonnell Boehnen Hulbert & Berghoff LLP

(57) ABSTRACT

With a computer-readable non-transitory recording medium that stores a program, the program causes an information processing apparatus to function as an error-code-accepting unit, a data-management unit, an extracting unit, and a creating unit. The error-code-accepting unit accepts an error code. The data-management unit has (i) image data, each of which is associated with a setting, the value of which can be adjusted, (ii) control programs that supplies an output to an image forming apparatus, and (iii) combination information about a combination of the image data and the control program. When the error code is accepted, the extracting unit extracts the image data and the control program. The creating unit creates a maintenance program by using the image data and control program.

20 Claims, 8 Drawing Sheets

MAINTENANCE PROGRAM CREATION FOR AN IMAGE FORMING APPARATUS

INCORPORATION BY REFERENCE

This application is based upon, and claims the benefit of priority from the corresponding Japanese Patent Application No. 2012-125373, filed in the Japan Patent Office on May 31, 2012, the entire contents of which are incorporated herein by reference.

BACKGROUND

Unless otherwise indicated herein, the description in this section is not prior art to the claims in this application and is not admitted to be prior art by inclusion in this section.

The present disclosure relates to a computer-readable non-transitory recording medium that stores a maintenance-program creating program, and further relates to an information processing apparatus. The present disclosure relates particularly to a technology that creates a computer-readable non-transitory recording medium in which a program is stored that changes settings that have been stored in an image forming apparatus to determine levels of operations by its operation mechanisms.

An ordinary image forming apparatus stores firmware, which is a program that controls the operation of the image forming apparatus. The firmware stores operation ranges, each of which indicates the range of operation performed by an operation mechanism included in the image forming apparatus. The firmware determines an operation level of the operation mechanism according to the value of a setting that has been set by a user within the operation range, and controls the operation of the operation mechanism. Values can be set for a plurality of settings that are adjustable by the image forming apparatus. These values are saved in a memory included in the image forming apparatus or another storage area.

As examples of an operation error in the image forming apparatus, the reference position of an image forming area corresponding to recording paper may deviate, a reference area allocated to read an original may deviate during a scanning operation, or a reference printing density may deviate from the correct density, for example. In this case, the value of the relevant setting needs to be changed to a new value by which the error is eliminated.

The user can change the value of the setting in a maintenance mode. However, a user who has no particular knowledge of an image forming apparatus, such as an end user, cannot often determine which setting should be changed for a respective operation.

SUMMARY

With a computer-readable non-transitory recording medium that stores a maintenance-program creating program according to an aspect of the present disclosure, the maintenance-program creating program causes an information processing apparatus to function as an error-code-accepting unit, a data-management unit, an extracting unit, and a creating unit. The error-code-accepting unit accepts an error code, which indicates details of an error, entered by a user.

The data-management unit has (i) image data, each of which is provided in correspondence to one of a predetermined number of settings, the values of which can be adjusted by an image forming apparatus; (ii) control programs, each of which is provided in correspondence to one of the image data, that accept, from the user, a specified value indicating an operation level of an operation indicated by a setting associated with the image data, and output the specified value to the image forming apparatus; and (iii) for each error code, combination information about a combination of the associated image data and the control program associated with the image data.

When the error-code-accepting unit accepts the error code, the extracting unit extracts, from the data-management unit, the image data and the control program that are indicated by the combination information corresponding to the accepted error code. The creating unit creates a maintenance program that accesses the image forming apparatus and rewrites the value of a setting stored in the image forming apparatus by using the image data and the control program that have been extracted by the extracting unit.

An information processing apparatus according to another aspect of the present disclosure has an error-code-accepting unit, a data-management unit, an extracting unit, and a creating unit. The error-code-accepting unit accepts an error code, which indicates details of an error, entered by a user. The data-management unit has (i) image data, each of which is provided in correspondence to one of a predetermined number of settings, the values of which can be adjusted by an image forming apparatus; (ii) control programs, each of which is provided in correspondence to one of the image data, that accept, from the user, a specified value indicating an operation level of an operation indicated by a setting associated with the image data, and output the specified value to the image forming apparatus; and (iii) for each error code, combination information about a combination of the associated image data and the control program associated with the image data.

When the error-code-accepting unit accepts the error code, the extracting unit extracts, from the data-management unit, the image data and the control program that are indicated by the combination information corresponding to the accepted error code. The creating unit creates a maintenance program that accesses the image forming apparatus and rewrites the value of a setting stored in the image forming apparatus by using the image data and the control program that have been extracted by the extracting unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
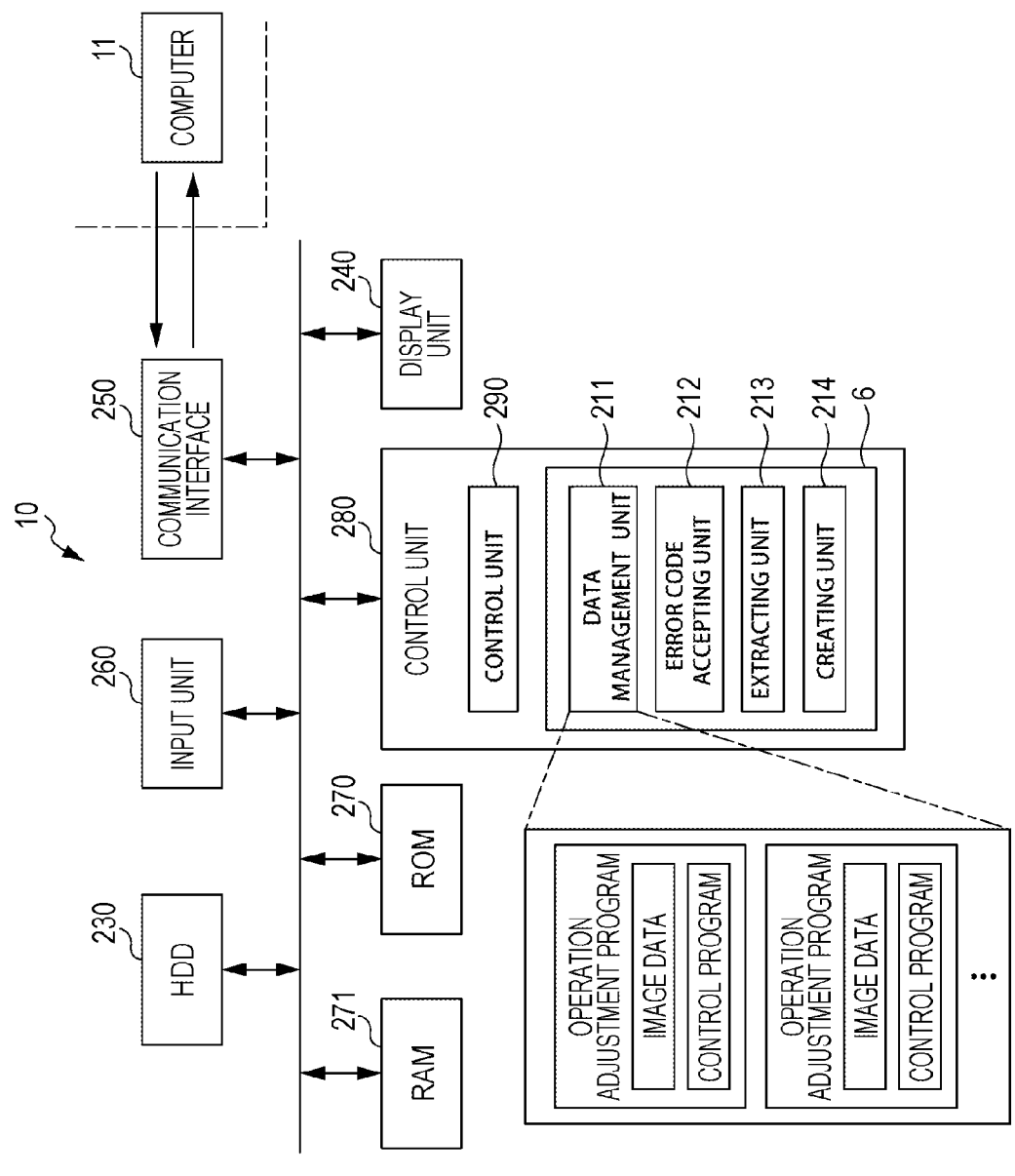
FIG. 1 illustrates an information processing apparatus according an embodiment of the present disclosure.

Exemplary apparatuses and methods are described herein. Other example embodiments or features may further be utilized, and other changes may be made, without departing from the spirit or scope of the subject matter presented herein. In the following detailed description, reference is made to the accompanying drawings, which form a part thereof. The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Embodiments of the present disclosure will be described with reference to the drawings.

FIG. 1 illustrates an information processing apparatus according an embodiment of the present disclosure. As an example, the information processing apparatus according to the present disclosure may take the form of a computer 10 and includes a management server and the like. A maintenance-program creating program 6 according to an embodiment of the present disclosure is installed in the computer 10. Specifically, the maintenance-program creating program 6 is installed from a compact disc-read-only memory (CD-ROM), a universal serial bus (USB) memory, or another recording medium. Alternatively, the maintenance-program creating program 6 is installed by, for example, being downloaded through the Internet, a local area network (LAN), or another network.

The computer 10 includes a control unit 280 that controls the entire operation of the computer 10, a read-only memory (ROM) 270, a random-access memory (RAM) 271, a hard disk drive (HDD) 230, a display unit 240, a communication interface 250, and an input unit 260. These components can send and receive data and signals among themselves through a central processing unit (CPU) bus.

The ROM 270 stores operation programs involved in the basic operations of the computer 10. The RAM 271 is used as, for example, the operation area of the control unit 280.

The HDD 230 stores, in its storage area, various programs operated in the computer 10, various types of data intended to be saved, and the like. The maintenance-program creating program 6 is also installed (stored) in the HDD 230.

The display unit 240, which includes a liquid crystal display (LCD) and the like, displays operation guides and other information for a user who manipulates the computer 10. The communication interface 250 is used for data communication to and from another computer 11 connected to the computer 10 so that communication is possible therebetween. This embodiment will be described with the assumption that a LAN is used for communication between the computer 10 and the computer 11. However, the communication method is not limited to the above-mentioned examples, and other communication methods may be used for communication between the computer 10 and the computer 11.

The input unit 260 includes a keyboard, a mouse pointer, and the like. For example, commands to create a maintenance program, error codes, and the like are input from the input unit 260. The error code is a keyword or an identification number assigned to each type of error to identify details of an error. The maintenance program accesses an image forming apparatus to cause it to rewrite values of settings stored in the image forming apparatus.

This setting of a value is achieved by an operation performed by an operation mechanism included in the image forming apparatus. Examples of settings include a destination image forming apparatus setting (for example, different settings depending on countries or areas which image forming apparatus is shipped), a toner area code setting, a drum refresh setting, a reference position setting of a printing area, which corresponds to recording paper, used by an image forming unit, a reference position setting in the reading of an original during a scan operation performed by an image reading unit, and a setting for the reference printing density in the image forming unit. To rewrite the value of a setting, the maintenance program outputs a changed value, which is used by the image forming apparatus to re-write the value of the setting. This value is used to determine an operation level of the relevant operation mechanism included in the image forming apparatus. The maintenance program will be described below in detail.

The control unit 280 includes a CPU and other components; specifically, it includes a control unit 290, which controls the entire operation of the computer 10, a data-management unit 211, an error-code-accepting unit 212, an extracting unit 213, and a creating unit 214. The control unit 280 operates as instructed by the maintenance-program creating program 6, which is installed in the HDD 230, and functions as the data-management unit 211, error-code-accepting unit 212, extracting unit 213, and creating unit 214. However, it is also possible to configure the data-management unit 211, error-code-accepting unit 212, extracting unit 213, and creating unit 214 with hardware circuits, instead of operations executed by the maintenance-program creating program 6, which is controlled by the control unit 280. Unless otherwise noted, this is also applicable in all other embodiments.

The data-management unit 211 includes a plurality of image data settings and control programs associated with them. The plurality of image data settings have been provided for each of a predetermined number of settings, the values of which can be adjusted by the image forming apparatus. The data-management unit 211 also displays associated settings. The image data corresponds to a displayed image to allow the user to specify a value or the like. A control program is provided for each setting. The control program performs control under which a specified value indicating an operation level of an operation indicated by the corresponding setting is accepted from the user, and the specified value is output to the image forming apparatus. That is, the control program is provided for each image data and accepts, from the user, a specified value indicating an operation level of an operation indicated by a setting associated with the image data, and outputs the specified value to the image forming apparatus. The data-management unit 211 has a predetermined number of combinations of image data associated for each setting and a control program associated with the image data. The data-management unit 211 associates a combination of corresponding image data and a control program associated with it with each error code. That is, the data-management unit 211 associates combination information, which indicates a combination of corresponding image data and a control program associated with it, with each error code. In this embodiment, a combination of the image data and the control program associated with it will be referred to as the operation adjusting program.

After the control programs have been installed in the computer, the computer accepts the value from the user within a predetermined numeric range. The predetermined numeric range is an operation range within which each operation mechanism included in the image forming apparatus can perform the operation corresponding to the setting. The predetermined numeric range is a further restricted range of numeric values determined by, for example, the manufacturer as numeric values for which each operation mechanism included in the image forming apparatus can correctly perform the operation corresponding to the setting. The restricted numeric range is preset by a programmer of the maintenance program such as, for example, the manufacturer of the image forming apparatus.

The error-code-accepting unit 212 accepts an error code, which indicates details of an error, entered by the user.

The extracting unit 213 extracts an operation adjustment program associated with the error code accepted by the error-code-accepting unit 212 from operation adjustment programs (each of which is a combination of image data and a control program) stored in the data-management unit 211, according to the combination information.

The creating unit 214 uses the operation adjustment program, which has been extracted by the extracting unit 213 as described above, to create the maintenance program described above. During the creation of the maintenance program, the creating unit 214 also performs an encryption process, such as a process based on Secure Socket Layer (SSL) technology, that makes it impossible to analyze the maintenance program. However, the encryption process may not be performed in other embodiments.

Thus, it becomes possible to disable an indefinite number of persons from analyzing the maintenance program and allow only particular persons selected by the programmer of the maintenance program to analyze the maintenance program. In addition, the encryption process prevents third parties, outsiders, and other unauthorized persons from, for example, rewriting the created maintenance program without permission from the programmer of the maintenance program.

Figure 2:
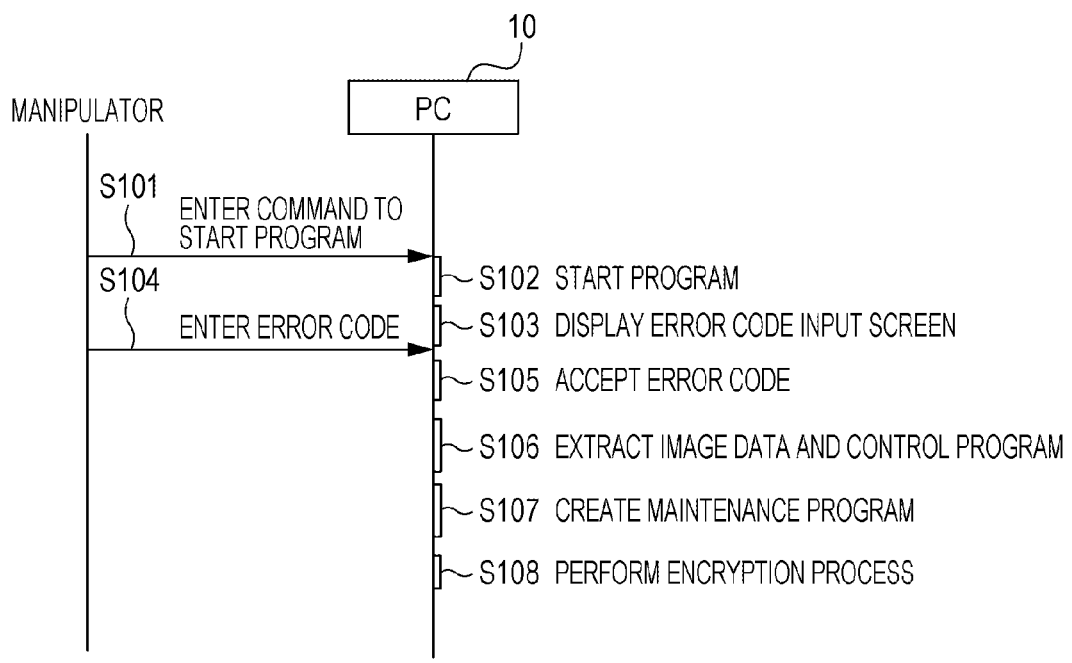
FIG. 2 is a sequence diagram illustrating a process in which a computer creates a maintenance program.
Figure 3:
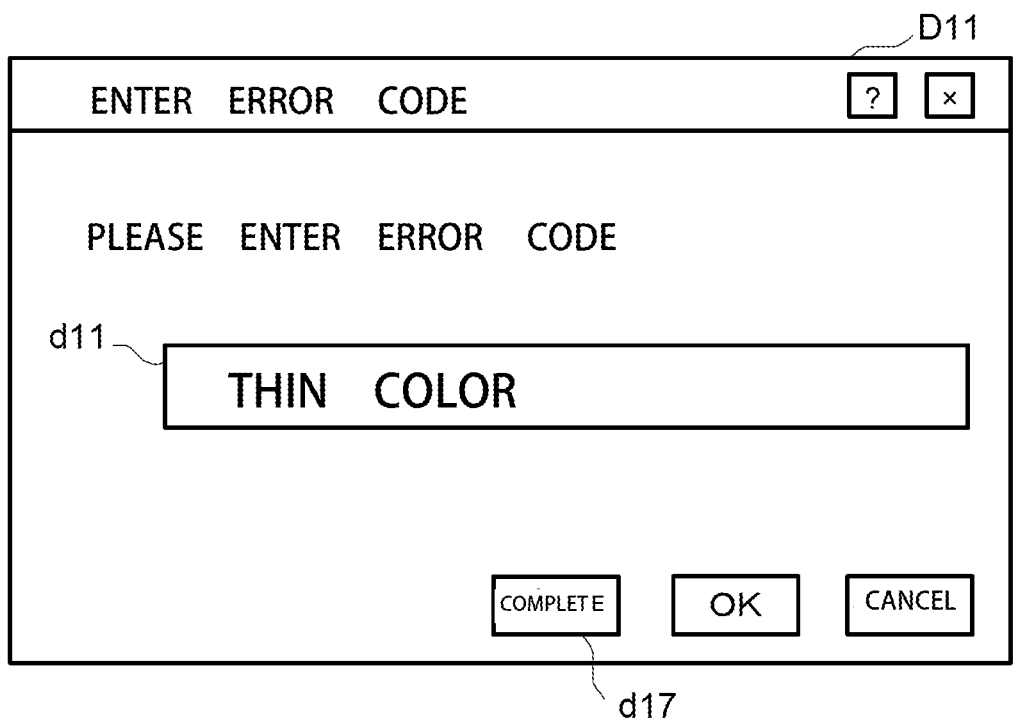
FIG. 3 illustrates an example of a display screen on a display unit.

Next, a process in which the computer 10 creates the maintenance program will be described. FIG. 2 is a sequence diagram illustrating a process in which the computer 10 creates the maintenance program. FIG. 3 illustrates an example of a display screen on the display unit. It will be assumed that the maintenance-program creating program 6 has been installed in the computer 10.

When the user, who is in this case the programmer of the maintenance program, enters a command to start the maintenance-program creating program 6 from the input unit 260 of the computer 10 (S101), the control unit 280 starts the maintenance-program creating program 6 (S102). The control unit 280 then functions as the data-management unit 211, error-code-accepting unit 212, extracting unit 213, and creating unit 214.

After that, the error-code-accepting unit 212 displays a message that prompts the user to enter an error code by, for example, displaying an error code input screen D11, which is illustrated in FIG. 3 as an example, on the display unit 240 (S103).

The user clicks an error code input field d11 by manipulating the mouse pointer or another device provided as part of the input unit 260, in response to the message prompting for the input of the error code displayed on the error code input screen D11 (S104). The user then enters a keyword or an identification number from the keyboard. The error-code-accepting unit 212 accepts the entered keyword or identification number as the error code (S105).

The user may perform the process in S104 several times, and the process in S105 may be performed accordingly. The error code input process is terminated, for example, when the user enters an error code for each of the operation adjustment programs to be embedded in the maintenance program in response to a message displayed on the value accepting screen D11, and then manipulates the input unit 260 to select the completion button d17 on the error code input screen D11.

The extracting unit 213 extracts, from the data-management unit 211, the operation adjustment program (image data and its corresponding control program) associated with the error code given to the error-code-accepting unit 212 (S106). If a plurality of error codes has been entered by the user, the extracting unit 213 extracts the operation adjustment programs associated with all these error codes in S106.

The extracting unit 213 stores keywords or identification numbers as error codes. If the error codes are identification numbers, the extracting unit 213 stores different code numbers in correspondence to different errors. For example, the extracting unit 213 stores identification number 00001 in correspondence to the setting "reference printing density", identification number 00002 in correspondence to the setting "reference printing area", and identification number 00003 in correspondence to the setting "reference reading area". In this case, the user recognizes the identification number corresponding to an error to be cleared from a correspondence table, given by, for example, the manufacturer of the image forming apparatus, in which correspondence between details of errors and identification numbers is presented as a list, after which the user enters the recognized identification number from the input unit 260.

If the error codes are keywords, the extracting unit 213 stores, as a keyword, a plurality of phrases in correspondence to a single setting. For example, the extracting unit 213 stores the keywords "thin (or dense) color", "image not printed", "abnormal density", and the like in correspondence to the setting "reference printing density", the keywords "incorrect position", "extrusion", "correction of position", and the like in correspondence to the setting "reference printing area", and the keywords "discontinued image", "read failure", and "correction of read position" in correspondence to the setting "reference read position."

The extracting unit 213 determines a setting corresponding to the entered error code according to the combination information about the setting corresponding to the keyword or identification number that has been given to the error-code-accepting unit 212 as the error code. When, for example, a keyword is given to the error-code-accepting unit 212, if the keyword matches any one of the plurality of stored keywords, the extracting unit 213 determines the setting associated with the given keyword from the correspondence (for example, by referring to the correspondence table).

In the process in S103 and S105, for example, the error-code-accepting unit 212 displays, on the display unit 240, a message that prompts the user to enter an error code, and accepts the entered error code according to the manipulation of the input unit 260 or the like performed by the user. As illustrated in FIG. 3, for example, the error-code-accepting unit 212 displays the error code input screen D11 having the error code input field d11 on the display unit 240. When the user clicks an error code input field d11 on the error code input screen D11 by manipulating the input unit 260 and enters a keyword or an identification number from the keyboard, the error-code-accepting unit 212 accepts the entered keyword or identification number as the error code.

The extracting unit 213 determines the setting corresponding to the error code given to the error-code-accepting unit 212, and extracts the operation adjustment program associated with the determined setting from the data-management unit 211. That is, the extracting unit 213 extracts, from the data-management unit 211, the operation adjustment program (image data and its corresponding control program) associated with the error code given to the error-code-accepting unit 212. The extracting unit 213 may be configured so as to extract the operation adjustment program directly according to the given error code, without storing the correspondence between error codes and operation adjustment programs and determining a setting corresponding to an error code.

When the error-code-accepting unit 212 accepts a keyword, an entered phrase may not match any stored keyword. Even in this case, if the error-code-accepting unit 212 approximates the entered phrase to a stored keyword, the extracting unit 213 may extract the operation adjustment program associated with the keyword to which the entered phrase has been approximated. An entered keyword is approximated to a stored keyword when, for example, there is a partial match between keywords such as, for example, between "top position error" and "top position deviation", there is a spelling error such as, for example, "PAPER JEM" intended for "PAPER JAM", or there is a case-sensitive error such as, for example, "paper jam" intended for "PAPER JAM". These are only examples; many variations are possible.

Then, the creating unit 214 creates a maintenance program according to the operation adjustment program extracted by the extracting unit 213 (S107). If a plurality of operation adjustment programs has been extracted in S106, the creating unit 214 creates maintenance programs so as to embody all extracted operation adjustment programs.

The creating unit 214 further performs, on the maintenance program, an encryption process, such as a process based on SSL technology, that makes it impossible to analyze the maintenance program (S108). In other embodiments, the creating unit 214 may not perform an encryption process.

The creating unit 214 may also use a known means to perform a process to set, in the maintenance program, a period during which the maintenance program can be used. This makes it possible to prevent the created program from being permanently used and to reduce the possibility that if the maintenance program is transferred to a third party, the maintenance program is used without permission.

Even if the user does not know specific settings that need to be adjusted to clear an error, that is, the user does not have the technical knowledge necessary to clear an error, the maintenance program creation process enables the user to create a maintenance program that can adjust the values of settings that needs to be adjusted to clear an error by entering a keyword or an identification number.

Although a process in which the user manipulates the computer 10 to create a maintenance program has been described above, the process is not limited to above mentioned examples. It is also possible to create a maintenance program on the computer 11, which can perform data communication with the computer 10. Specifically, to create a maintenance program on the computer 11, the computer 11 may access the computer 10, after which the data-management unit 211, error-code-accepting unit 212, extracting unit 213, and creating unit 214 in the computer 10 may communicate with a browser in the computer 11 through the communication interface 250 to receive commands described above from the browser in the computer 11 and to perform a process by which the browser can perform the various display processes described above.

Figure 4:
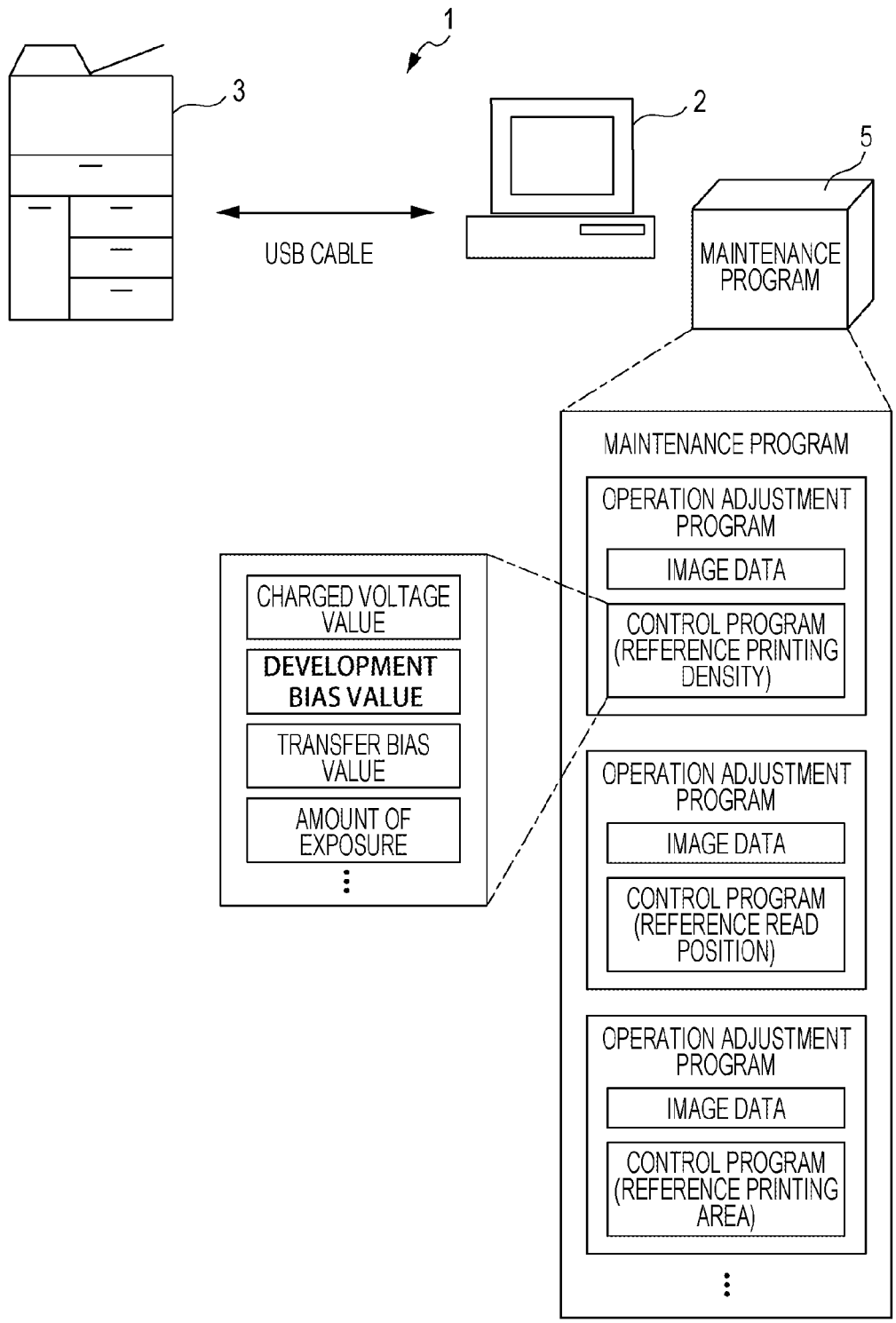
FIG. 4 illustrates a maintenance system in which a maintenance program is used.

Next, the maintenance program created in the maintenance program creation process and its usage will be described. FIG. 4 illustrates a maintenance system in which the maintenance program is used.

A maintenance system 1 includes a computer 2 and an image forming apparatus 3.

The computer 2 is an example of an information processing apparatus. The maintenance program 5 described above is installed in the computer 2. Specifically, the maintenance program 5 is installed from a CD-ROM, a USB memory, or another recording medium. Alternatively, the maintenance program 5 is installed by, for example, being downloaded through the Internet, a LAN, or another network.

The image forming apparatus 3 in this embodiment is a Multifunction Peripheral that includes a copy function, a printer function, a fax function, a scanner function, and other functions. The image forming apparatus 3 can perform data communication to and from the computer 2. Firmware, which is a set of programs that control the operation mechanisms included in the image forming apparatus 3, has been installed in a mask ROM on the control board of the image forming apparatus 3 or in a flash memory connected to the image forming apparatus 3 through an interface. A control unit in the image forming apparatus 3 operates as commanded by the firmware to control the operations of the operation mechanisms.

The maintenance program 5 outputs a changed value used to rewrite the value of a setting implemented by the operation of an operation mechanism included in the image forming apparatus 3. The maintenance program 5 is created on the computer 10 as described above.

As illustrated in FIG. 4, the maintenance program 5 includes an operation adjustment program for each setting, the value of which is to be adjusted.

As described above, the operation adjustment program includes image data and a control program. The image data is used on a display unit 24 (see FIG. 5) of the computer 2. The image data is created in, for example, an extensible markup language (XML) format. Tagged text of the image data created in XML format is parsed by an XML parser unit 7 (see FIG. 5) included in the computer 2, after which the image data is converted by a browser included in the computer 2 into a drawing format conforming to the display unit 24. Then, the image data in the drawing format is displayed on the display unit 24. The image data, which indicates, for example, the name of the associated setting, is displayed on the display unit 24 by the XML parser unit 7 and a browser 8 (see FIG. 5) as a command accepting image that accepts from the user a command to change the value of the setting. The control program has functions that perform a process involved in displaying the image data, a process to accept the value of the setting associated with the image data from the user, and a process to output the accepted value to a processing unit, included in the image forming apparatus 3, that rewrites the value.

The value of the setting includes a control value for the operation of one or a plurality of operation mechanisms. When, for example, the setting is the reference printing density, the relevant control program accepts control values for the operation of the operation mechanism that is needed to operate to change the printing density. The control values may be, for example, the surface potential of a photosensitive drum (value of a voltage charged by a charging device), a development bias of a developing device, a transfer bias of a transfer device, and the amount of exposure by an exposing device. That is, in this example, control values are the values of the voltage charged by the charging device, the development bias value of the developing device, the transfer bias value of the transfer device, the amount of exposure by the exposing device, and the like. The manufacturer selects an operation mechanism for the operation of which a control value is be accepted as the value according to the value of the setting to be rewritten through experience, for example. The manufacturer then embeds the selected operation mechanism as a function of the control program.

The image forming apparatus 3 receives value rewriting information, which indicates a value output from the computer 2 and also includes a setting to which the value is applied, and changes the value, which has been saved, of the setting indicated in the value rewriting information to the value included in the value rewriting information.

In the image forming apparatus 3, operation control firmware controls the operations of the operation mechanisms according to the values of the settings. In rewriting the above value, however, only the values of settings stored in the image forming apparatus 3 are rewritten and the firmware itself is not rewritten.

Figure 5:
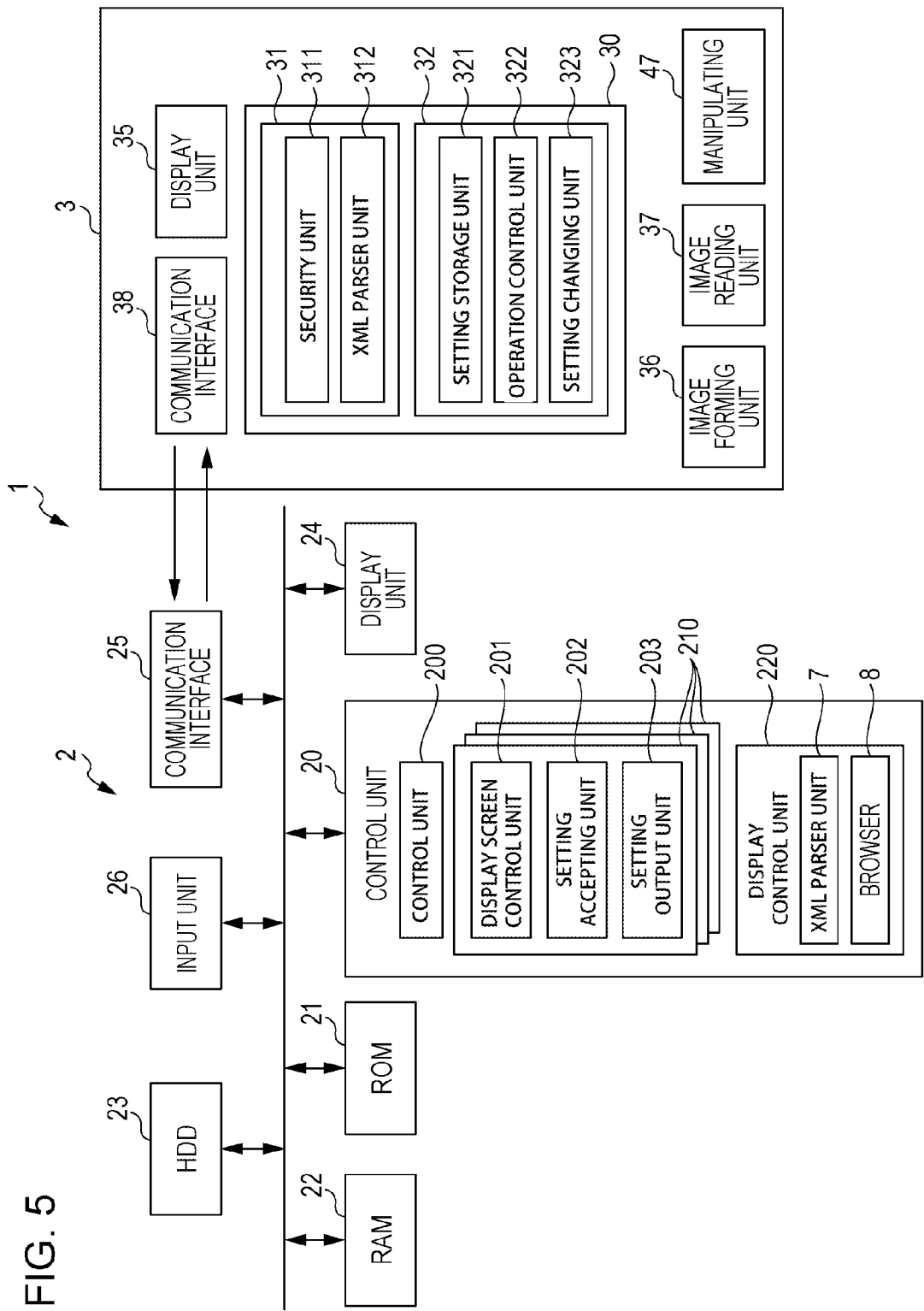
FIG. 5 is a block diagram schematically illustrating the structures of a computer and an image forming apparatus, which constitute a maintenance system.

FIG. 5 is a block diagram schematically illustrating the structures of the computer 2 and image forming apparatus 3, which constitute the maintenance system 1. The figure and description given below mainly illustrate a structure related to the functions of the maintenance program 5.

First, the structure of the computer 2 will be described. The computer 2 includes a control unit 20, which controls the entire operation of the computer 2, a ROM 21, a RAM 22, an HDD 23, a display unit 24, a communication interface 25, and an input unit 26. These components can send and receive data and signals among themselves through a CPU bus.

The maintenance program 5 is installed (stored) in the HDD 23.

The display unit 24 displays a command accepting image based on the image data, operation guides for a user who manipulates the computer 2, and other information.

The communication interface 25 is used for data communication to and from the image forming apparatus 3. This embodiment will be described with the assumption that a USB cable is used for communication between the communication interface 25 and the image forming apparatus 3. However, the communication between the communication interface 25 and the image forming apparatus 3 is not limited to abovementioned examples; other communication methods may be used for communication between the communication interface 25 and the image forming apparatus 3.

The input unit 26 includes a keyboard, a mouse pointer, and the like. The input unit 26 accepts, from the user, the values of settings for which operation mechanisms can operate in the image forming apparatus 3 and other inputs. Examples of these settings include destination setting, a toner area code, drum refresh setting, the reference position of a printing area, corresponding to recording paper, used by the image forming unit, the reference position in the reading of the original during a scan operation by the image reading unit, and the reference printing density in the image forming unit.

The control unit 20 includes a CPU and other components; specifically, it includes a control unit 200, maintenance control units 210, and a display control unit 220.

The control unit 20 operates as instructed by operation adjustment programs included in the maintenance program 5, which are installed in the HDD 23, and functions as the maintenance control units 210 corresponding to the operation adjustment programs. Therefore, if the maintenance program 5 includes an operation adjustment program for each of the plurality of settings described above, the control unit 20 functions as having as many maintenance control units 210 as there are operation adjustment programs.

The control unit 200 controls the operation of the entire computer 2.

The maintenance control unit 210 controls a process needed to perform maintenance of the image forming apparatus 3 connected to the computer 2. Each maintenance control unit 210 includes a display screen control unit 201, a value accepting unit 202, and a value output unit 203.

The display screen control unit 201 stores image data associated with settings, the values of which can be adjusted by the image forming apparatus 3, the settings having been designated as eligible for adjustment by the operation adjustment programs. The image data indicates, for example, the name of the associated setting. An image indicated by the image data included in the display screen control unit 201 is displayed on the display unit 24 by the browser 8, which will be described later in detail, as the command accepting image.

The value accepting unit 202 accepts, from the user, a value to be set in the setting associated with the image data that indicates the command accepting image within a prescribed range, according to the manipulation performed by the user in response to the command accepting image displayed on the display unit 24 by the browser 8. The prescribed range is an operation range within which each operation mechanism included in the image forming apparatus 3 can perform the operation corresponding to the setting described above. The prescribed numeric range is a further restricted range of numeric values determined by, for example, the manufacturer as numeric values for which the operation mechanism can appropriately perform the operation corresponding to the setting. The restricted numeric range is preset in the value accepting unit 202 by a programmer of the maintenance program 5 such as, for example, the manufacturer of the image forming apparatus 3.

If a setting, the value of which is to be rewritten by the operation adjustment program, which functions as the maintenance control unit 210, is, for example, the reference printing density, the preset numeric range has been determined for each of the value of a voltage charged by the charging device, the development bias of the developing device, the transfer bias of the transfer device, the amount of exposure by the exposing device, and other settings that contribute to the changing of the reference printing density.

The value output unit 203 outputs value rewriting information, which indicates the value accepted by the value accepting unit 202 and also includes a setting to which the value is to be applied, to the image forming apparatus 3. The value output unit 203 communicates with the image forming apparatus 3 through the communication interface 25. For example, the value output unit 203 encrypts the value rewriting information, which includes data in XML format, in SSL format or the like before outputting the value rewriting information to the image forming apparatus 3. The value rewriting information output by the value output unit 203 is not limited to XML format. In this embodiment, however, XML format is used as an example.

The display control unit 220 controls image display operation performed by the display unit 24. The display control unit 220 includes the browser 8 and XML parser unit 7. The XML parser unit 7 parses image data in XML format included in the display screen control unit 201 and converts the image data into data in a drawing format conforming to the display unit 24. The browser 8 uses the converted data to display an image corresponding to the image data on the display unit 24 as the command accepting image.

Next, the structure of the image forming apparatus 3 will be described.

The image forming apparatus 3 includes a control unit 30, a display unit 35, an image forming unit 36, an image reading unit 37, a communication interface 38, and a manipulating unit 47.

The communication interface 38 is used for data communication to and from the computer 2. This embodiment will be described with the assumption that a USB cable is used for communication to and from the computer 2, as described above.

The control unit 30, which includes a CPU, a ROM and a RAM, controls the operation of the image forming apparatus 3. The control unit 30 also includes a mask ROM (or a flash memory). Firmware, which is a set of programs that control the operation of the image forming apparatus 3, has been installed in the mask ROM. The control unit 30 operates as instructed by the firmware to function as a value information obtaining unit 31 and a control unit 32.

The value information obtaining unit 31 obtains the value rewriting information described above from the computer 2 through the communication interface 38.

The value information obtaining unit 31 includes a security unit 311 and an XML parser unit 312. Programs that operate the control unit 30 have been stored in the mask ROM. The control unit 30 operates as commanded by the programs to function as the security unit 311 and XML parser unit 312.

The security unit 311 performs an encryption process and a decryption process in, for example, SSL format used in data communication to and from the computer 2. The security unit 311 decrypts data, obtained from the computer 2, which has been encrypted in SSL format or the like, and also causes the computer 2 to perform an encryption process in SSL format or the like on data to be output.

The XML parser unit 312 parses the XML-format data received from the computer 2 and decrypted by the security unit 311 and converts the decrypted data into data in a data format that the control unit 32 can handle.

The control unit 32 controls the operation mechanisms included in the image forming apparatus 3. The control unit 32 includes an operating system (OS) and entities. The control unit 32, for example, manages process input/output according to data obtained after the parsing by the XML parser unit 312. From a functional viewpoint, the control unit 32 functions as a value storage unit 321, an operation control unit 322, and a value changing unit 323.

The value storage unit 321 stores, for example, a charged voltage value, the amount of exposure, a development bias, a transfer bias, a fixing temperature, the rotational speed of a paper transport roller, and other control values, which are required to operate a charging unit, an exposure unit, a developing unit, a transfer unit, a fixing unit, a paper transport mechanism and other operation mechanisms, which constitute the image forming unit 36.

The operation control unit 322 controls the operations of the operation mechanisms included in the image forming apparatus 3, which are, for example, the image forming unit 36 and image reading unit 37. The operation control unit 322 uses values stored in the value storage unit 321 to control the operations of the operation mechanisms included in the image forming apparatus 3. Operation mechanisms, included in the image forming apparatus 3, the operations of which are controlled by the operation control unit 322, are not limited to the image forming unit 36 and image reading unit 37.

The value changing unit 323 receives the value rewriting information, which has been obtained from the image forming apparatus 3 by the value information obtaining unit 31. The value changing unit 323 changes a value, out of the values stored in the value storage unit 321 with respect to the operation mechanisms, that corresponds to the setting indicated by the obtained value rewriting information to a value indicated in the value rewriting information.

The image forming unit 36 is a mechanism that forms an image to be recorded on a recording medium. The image forming unit 36 includes, for example, the charging unit, exposure unit, developing unit, transfer unit, fixing unit, and paper transport mechanism, as described above.

The image reading unit 37 includes a scanner (that reads an original) and other components.

The manipulating unit 47 includes a numeric keypad, a start key used to enter an image forming command, and the like. The manipulating unit 47 accepts various manipulation commands, entered by the user, to the image forming apparatus 3.

Figure 6:
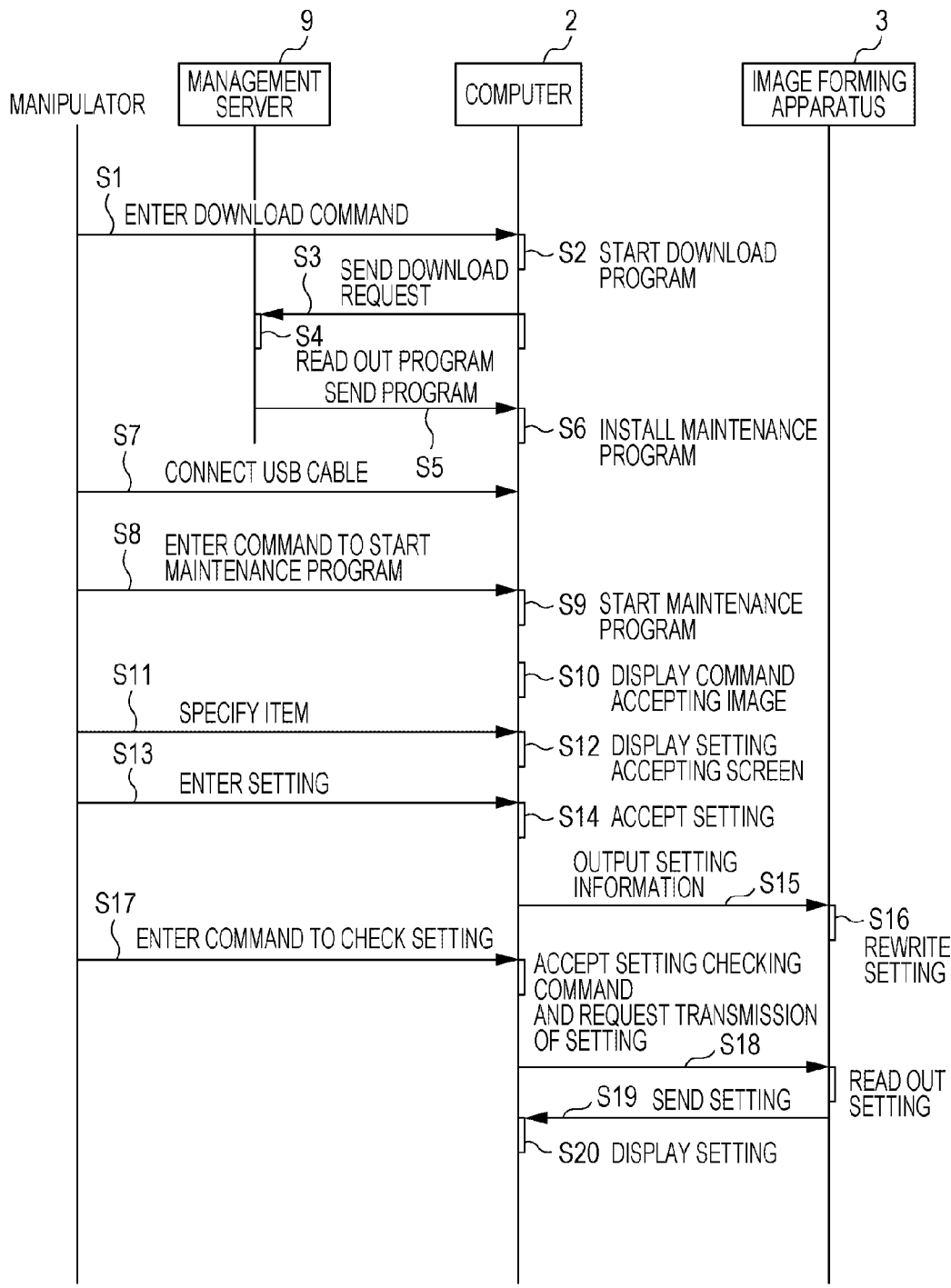
FIG. 6 is a sequence diagram illustrating a process to rewrite, on the computer in the maintenance system, the value of a setting related to the operation of an operation mechanism in the image forming apparatus.

Next, a process to rewrite, on the computer 2 in the maintenance system 1, the values of the settings related to the operations of the operation mechanisms included in the image forming apparatus 3 will be described. FIG. 6 is a sequence diagram illustrating a process to rewrite, on the computer 2 in the maintenance system 1, the value of the setting related to the operation of the operation mechanism in the image forming apparatus 3.

It will be assumed that the maintenance program 5 has been installed in the computer 2. When, for example, the maintenance program 5 is obtained from a management server 9 through a network, the user manipulates the input unit 26 of the computer 2 to enter, into the computer 2, a command to download the maintenance program 5 (S1) so that a download program installed in the HDD 23 in the computer 2 is started (S2). The download program is used to access a web site of the management server 9. A request to download the maintenance program 5 is then sent from the computer 2 (S3).

The management server 9 searches its storage unit for the maintenance program 5 to be downloaded in response to the download request, reads out the maintenance program 5 (S4), and sends it to the computer 2 (S5). Thus, the maintenance program 5 is downloaded to the computer 2 and is installed in the HDD 23 in the computer 2 (S6).

Next, the user connects one end of a USB cable to the communication interface 25 in the computer 2 (S7), and also connects the other end of the USB cable to the communication interface 38 in the image forming apparatus 3.

When the user enters a command to start the maintenance program 5 from the input unit 26 in the computer 2 (S8), the control unit 20 starts the maintenance program 5 (S9). Thus, the control unit 20 functions as the maintenance control unit 210, which includes the display screen control unit 201, value accepting unit 202, and value output unit 203.

Figure 7:
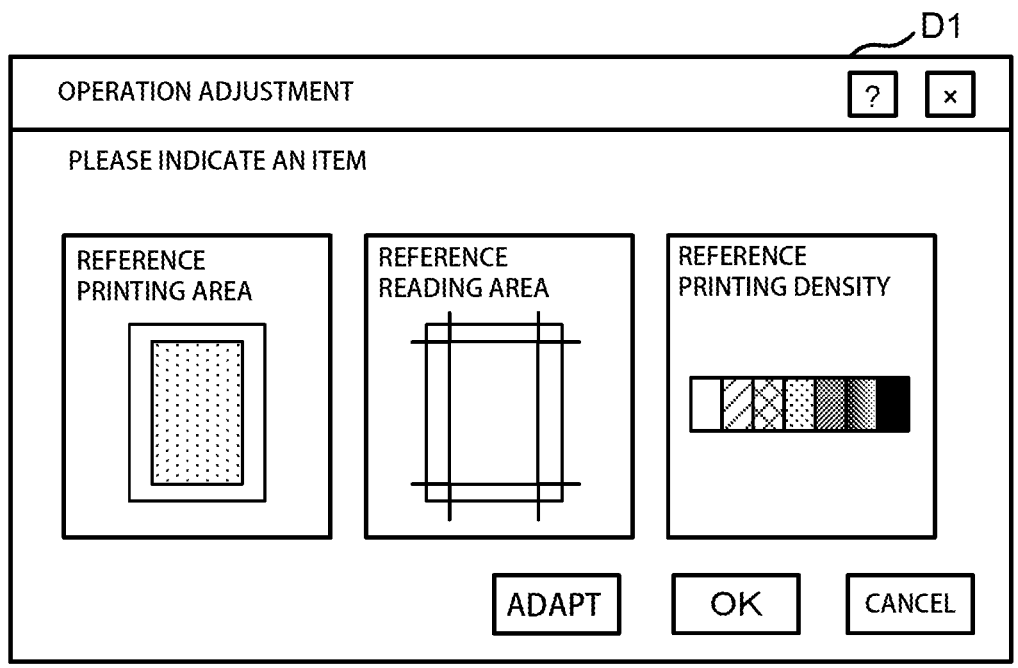
FIG. 7 illustrates an example of a display screen on a display unit.

Then, the XML parser unit 7 parses image data in, for example, XML format that is stored in the display screen control unit 201 corresponding to each operation adjustment program included in the maintenance program 5, and converts the image data to image data in a drawing format suitable for display on the display unit 24. The browser 8 displays the converted image data on the display unit 24 as the command accepting image (S10). An example of a display screen provided on the display unit 24 is illustrated in FIG. 7 as a display screen D1. FIG. 7 illustrates an example in which the maintenance program 5 includes operation adjustment programs corresponding to the settings for the reference printing area, reference read area, and reference printing density.

Figure 8:
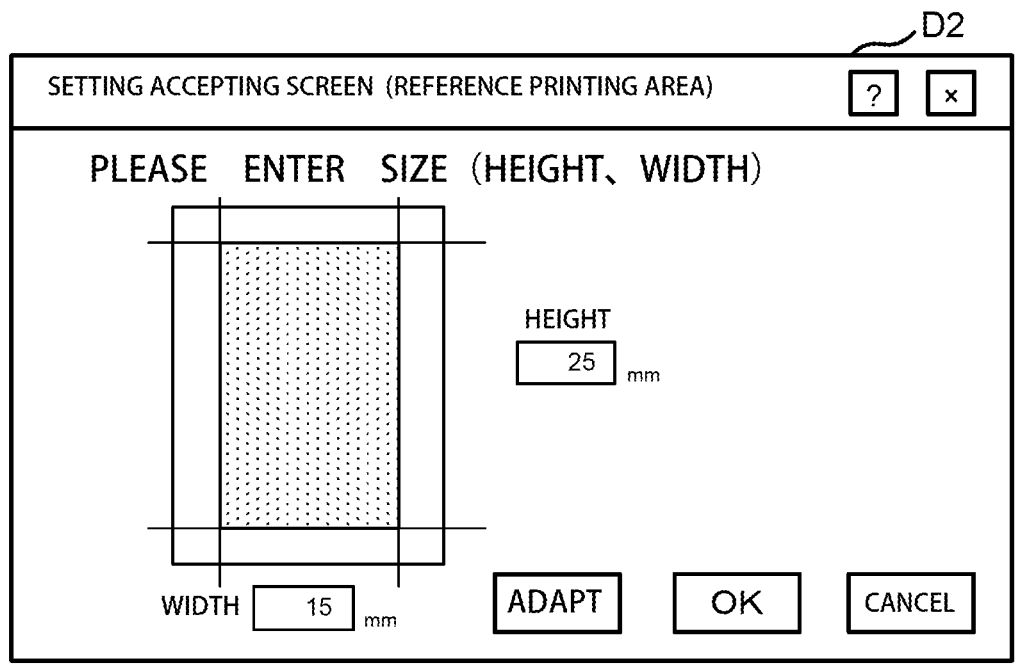
FIG. 8 illustrates an example of another display screen on the display unit.

When the user then manipulates the input unit 26 to specify a command accepting image, displayed on the display unit 24, that indicates a setting, the value of which is to be changed (S11), the display screen control unit 201, in the maintenance control unit 210, that corresponds to the specified setting causes the XML parser unit 7 and browser 8 to display a value accepting screen D2, as illustrated in FIG. 8, on the display unit 24 (S12).

When the user then manipulates the input unit 26 to enter a desired value (S13), the value accepting unit 202 accepts the entered value (S14). In this case, only when the entered value is within the predetermined numeric range described above does the value accepting unit 202 accept the value.

Then, the value output unit 203 outputs value rewriting information, which indicates the value and the setting to which the value is applied, as encrypted XML data from the communication interface 25 to the image forming apparatus 3 (S15). In data communication between the computer 2 and the image forming apparatus 3, including transmission of the value rewriting information from the value output unit 203 to the image forming apparatus 3, information to be sent is preferably encrypted in, for example, SSL format before it is transmitted and received. In this embodiment, the value output unit 203 encrypts the value rewriting information in SSL format before sending it to the image forming apparatus 3.

In the image forming apparatus 3, the security unit 311 obtains the encrypted value rewriting information through the communication interface 38 and decrypts the obtained value rewriting information. The setting indicated by the decrypted value rewriting information and the value to be applied to the setting are parsed by the XML parser unit 312.

The value changing unit 323 uses the setting indicated in the value rewriting information and the value to be applied to the setting to change the value, stored in the value storage unit 321, of the setting indicated by the obtained value rewriting information to the value indicated in the value rewriting information (S16).

The operation adjustment program further causes the computer 2 to function as a value checking unit (not shown) that obtains the value from the image forming apparatus. When the control unit 20 in the computer 2 operates as commanded by the operation adjustment program, the maintenance control unit 210 further functions as the value checking unit. Upon completion of the process in S16, the user manipulates the input unit 26 of the computer 2 to enter a command to check the value of the setting, which has been changed by the image forming apparatus 3 (S17). The value checking unit accepts the checking command and sends a request through the communication interface 25 to the image forming apparatus 3 to ask it to send the new value of the setting, which has been obtained in S16 (S18). In the image forming apparatus 3, the operation control unit 322, for example, reads out, from the value storage unit 321, a value that is stored at that time and is indicated by the value sending request. The read-out value may be sent through the communication interface 38 to the computer 2 (S19). In the computer 2, the value checking unit displays the value of the setting, which has been sent from the image forming apparatus 3, on the display unit 24 (S20). In addition to displaying the value of the setting, the computer 2 enables the user to confirm that the value has been rewritten by the image forming apparatus 3 as expected.

Thus, when the image forming apparatus 3 causes an operational problem and a new value that can solve the problem must be set, a situation can be prevented in which the user sets a value by which the operation mechanism in the image forming apparatus 3 does not operate properly. In the image forming apparatus 3, it is also possible to prevent this situation without having to change, for example, a rewritable range of the values stored in firmware by creating firmware that is usually used to control operation or by rewriting the firmware.

Therefore, with the maintenance program 5, computer 2, or maintenance system 1 in this embodiment, when operation of the image forming apparatus 3 needs to be adjusted, a value that determines an operation level of an operation mechanism included in the image forming apparatus 3 can be correctly changed to a value that assures that the operation mechanism operates appropriately.

In this embodiment, when values for functions of the image forming apparatus 3 need to be changed, value adjustment can be performed at an early stage for each function of the image forming apparatus 3 by outputting a new value from the computer 2, and the above value adjustment can be performed for each image forming apparatus 3. In addition, since firmware in the image forming apparatus 3 does not need to be rewritten, the value adjustment can be performed at an early stage with less man-hours.

Although, in the above embodiments, an example has been described in which data in XML format is used as image data and other data included in the operation adjustment program, data formats is not limited to above mentioned examples; data formats other than XML format can also be used.

The present disclosure is not limited to the embodiments described above; many variations are possible. The structures and processes in the embodiments described with reference to FIGS. 1 to 8 are each only an embodiment of the present disclosure; structures and processes in the present disclosure are not limited to them.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the ladder diagrams and flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the ladder diagrams and flow charts discussed herein, and these ladder diagrams and flow charts may be combined with one another, in part or in whole.

The invention claimed is:

1. A computer-readable non-transitory recording medium that stores a program that causes an information processing apparatus to function as:

an error-code-accepting unit that accepts an error code, which indicates details of an error, entered by a user;

a data-management unit comprising:
  image data, each of which is provided in correspondence to one of a predetermined number of settings, wherein the settings have values that can be adjusted in an image forming apparatus,
  control programs, each of which is provided in correspondence to one of the image data, that accept, from the user, a specified value indicating an operation level of an operation indicated by the setting corresponding to the one of the image data, and output the specified value to the image forming apparatus, and
  for each error code, combination information about a combination of the associated image data and the control program associated with the image data;
an extracting unit that, when the error-code-accepting unit accepts the error code, extracts, from the data-management unit, the image data and the control program that are indicated by the combination information corresponding to the accepted error code; and
a creating unit that creates a maintenance program that accesses the image forming apparatus and rewrites a value of a stored setting in the image forming apparatus to the specified value by using the image data and the control program that have been extracted by the extracting unit.

2. The recording medium according to claim 1, wherein during creation of the maintenance program by using the extracted image data and the control program, the creating unit performs an encryption process by which analysis of the maintenance program is made impossible.

3. The recording medium according to claim 1, wherein the creating unit sets a period during which the maintenance program can be used.

4. The recording medium according to claim 1, wherein the image data is created in an extensible markup language (XML) format.

5. The recording medium according to claim 1, wherein the extracting unit stores a keyword or an identification number as the error code.

6. The recording medium according to claim 3, wherein even if an entered phrase does not match any stored keyword during keyword acceptance by the error-code-accepting unit, when the error-code-accepting unit approximates the phrase to a stored keyword, the extracting unit extracts an operation adjustment program associated with the keyword to which the entered phrase is approximated.

7. The recording medium according to claim 5, wherein when identification numbers are used as error codes, the extracting unit stores different numbers in correspondence to different errors.

8. The recording medium according to claim 7, wherein:
  the extracting unit stores a correspondence table in which correspondence between details of errors and identification numbers is indicated as a list; and
  the error-code-accepting unit displays the correspondence table.

9. The recording medium according to claim 5, wherein when the extracting unit stores a keyword as the error code, the extracting unit stores, as the keyword, a plurality of phrases in correspondence to a single setting.

10. The recording medium according to claim 9, wherein the extracting unit determines a setting corresponding to the entered error code according to a correspondence of the setting to a plurality of keywords or a plurality of identification numbers, which have been given to the error-code-accepting unit as the error code.

11. An information processing apparatus having at least a CPU, a memory, an input unit, a display unit, and a communication unit, the information processing apparatus comprising:
  an error-code-accepting unit that accepts an error code, which indicates details of an error, and wherein the error code is entered by a user on the input unit;
  a data-management unit comprising:
    image data, each of which is provided in correspondence to one of a predetermined number of settings, wherein the settings have values that can be adjusted in an image forming apparatus,
    control programs, each of which is provided in correspondence to one of the image data, that accept, from the user, a specified value indicating an operation level of an operation indicated by the setting corresponding to the one of the image data, and output the specified value to the image forming apparatus, and
    for each error code, combination information about a combination of the associated image data and the control program associated with the image data;
  an extracting unit that, when the error-code-accepting unit accepts the error code, extracts, from the data-management unit, the image data and the control program that are indicated by the combination information corresponding to the accepted error code; and
  a creating unit that creates a maintenance program that accesses the image forming apparatus through the communication interface and rewrites a value of a stored setting in the image forming apparatus to the specified value by using the image data and the control program that have been extracted by the extracting unit.

12. The apparatus according to claim 11, wherein during creation of the maintenance program by using the extracted image data and the control program, the creating unit performs an encryption process by which analysis of the maintenance program is made impossible.

13. The apparatus according to claim 11, wherein the creating unit sets a period during which the maintenance program can be used.

14. The apparatus according to claim 11, wherein the image data is created in an extensible markup language (XML) format.

15. The apparatus according to claim 11, wherein the extracting unit stores a keyword or an identification number as the error code.

16. The apparatus according to claim 13, wherein even if an entered phrase does not match any stored keyword during keyword acceptance by the error-code-accepting unit, when the error-code-accepting unit approximates the phrase to a stored keyword, the extracting unit extracts an operation adjustment program associated with the keyword to which the entered phrase is approximated.

17. The apparatus according to claim 15, wherein when identification numbers are used as error codes, the extracting unit stores different numbers in correspondence to different errors.

18. The apparatus according to claim 17, wherein:
  the extracting unit stores a correspondence table in which correspondence between details of errors and identification numbers is indicated as a list; and
  the error-code-accepting unit displays the correspondence table.

19. The apparatus according to claim 15, wherein when the extracting unit stores a keyword as the error code, the extracting unit stores, as the keyword, a plurality of phrases in correspondence to a single setting.

20. The apparatus according to claim 19, wherein the extracting unit determines a setting corresponding to the entered error code according to a correspondence of the setting to a plurality of keywords or a plurality of identification numbers, which have been given to the error-code-accepting unit as the error code.

* * * * *